March 11, 1969 L. A. MORINE 3,432,761
METHOD AND ELECTRONIC SYSTEM FOR IMPROVING A CONTROL SIGNAL-TO-NOISE RATIO IN HIGH NOISE ENVIRONMENT ELECTRONIC SYSTEMS
Filed June 14, 1967

INVENTOR.
LOUIS A. MORINE
BY Herbert L. Davis
ATTORNEY

United States Patent Office 3,432,761

Patented Mar. 11, 1969

3,432,761

METHOD AND ELECTRONIC SYSTEM FOR IMPROVING A CONTROL SIGNAL-TO-NOISE RATIO IN HIGH NOISE ENVIRONMENT ELECTRONIC SYSTEMS

Louis A. Morine, Mahwah, N.J., assignor to The Bendix Corporation, a corporation of Delaware Filed June 14, 1967, Ser. No. 646,046

U.S. Cl. 328—165 8 Claims

Int. Cl. H03b *1/04*

ABSTRACT OF THE DISCLOSURE

A method and electronic system for improving the control signal-to-noise ratio in high noise environmental electronic systems in which a noisy periodic input signal is simultaneously fed both to an amplifier and to a multiplier, and the outputs of both of which are summed and then amplified to provide an output signal a portion of which output signal is suitably delayed and fed back to the multiplier where it is multiplied by the noisy periodic input signal in an arrangement in which so long as the delay network has a delay time equal to a multiple of the period of the input signal, the periodic input signal will be amplified, but in which due to the randomness of the noise present in the periodic input signal, the noise will not be amplified as greatly as the periodic input signal so as to provide an output signal in which the value of the periodic input signal is substantially increased over that of the noise component so as to thereby improve the signal-to-noise ratio.

BACKGROUND OF THE INVENTION

*Field of the invention*

A method and electronic system for improving a control signal-to-noise ratio in high noise environment systems such as daylight star trackers and the like in which there is utilized a super-regenerative feedback loop in which through multiplication the feedback is proportional to a product of the input and a time delayed output in order to enhance periodic input signals having harmonics of the basic frequency of the system while rejecting all other signals such as noise components of the input signal.

*Description of the prior art*

The invention relates to an improved method and electronic system for rejecting noise signals over that heretofore utilized in prior art devices such as shown by U.S. Patent No. 2,908,812 granted Oct. 13, 1959 to G. J. Laurent in which there is provided in FIGURE 1 thereof a system for improving signal-to-noise ratio comprising a multiplier, adder, and a feedback delay circuit. In the Laurent system, the feedback is fed into the adder rather than into a multiplier, and further the output of the multiplier in the Laurent patent is itself delayed before being fed back to the input through the adder. Thus in the Laurent patent, the input signal is multiplied by an input signal as delayed by a delay circuit and in turn adds the result to itself at the adder as delayed by a second delay circuit, rather than an amplified input being added to a product obtained by a multiplier in multiplying the input by a time delayed sum of the amplified input and the output of the multiplier, as in the present invention.

Further the prior art U.S. Patent No. 3,023,966 granted Mar. 6, 1962 to William H. Cox et al. shows in FIGURE 6 thereof, a system for correlating a plurality of input signals comprising multipliers, delay circuits, and an addition junction. The Cox et al. patent, however, does not disclose among other things the regenerative feedback of the present invention.

Other patents in the prior art show various combinations of multipliers, adders and feedback loops as in a U.S. Patent No. 3,278,894 granted Oct. 11, 1966 to R. L. Sanders which shows a solid state servo control system comprising a multiplier, an adder, and a feedback loop to the multiplier; U.S. Patent No. 3,026,475 granted Mar. 20, 1962 to S. Applebaum and U.S. Patent No. 3,243,604 granted Mar. 29, 1966 to N. J. Johnson show conventional frequency spectrum analysis systems; while U.S. Patent No. 2,987,701 granted June 6, 1961 to W. W. Grannemann, U.S. Patent No. 3,045,916 granted July 24, 1962 to L. C. Downes and U.S. Patent No. 3,213,450 granted Oct. 19, 1965 to D. Goor, all disclose various systems for eliminating undesired signals for improving a control signal-to-noise ratio, but such prior art patents fail to suggest the novel method and electronic system of the present invention.

As distinguished then from the prior art methods and systems, in the present invention the noisy input control signal is simultaneously fed to both an amplifier and to a multiplier with the outputs from both the amplifier and multiplier being summed and then further amplified to provide an output signal, a portion of which output signal is suitably delayed in a time delay network and then fed back to the multiplier where it is multiplied by the periodic input control signal. However, so long as the delay time is equal to or a multiple of the period of the input signal, the input signal and harmonics thereof will be amplified by the multiplying action of the multiplier, but due to the randomness of the noise component present with the input signal, the multiplier will effect rejection of the noise component to be effected at the output and an improvement in the control signal-to-noise component ratio.

SUMMARY OF THE INVENTION

The invention contemplates the provision of a method and a data correlator system to improve the signal-to-noise ratio of systems where the information or control signal is present as a phase, phase width, or amplitude modulation periodic signal.

Thus, the method and electronic system of the present invention contemplates a multiplication technique which enhances the basic periodic signal and harmonics thereof while rejecting all other signals such as random noise signals.

Another object of the invention is to provide a data correlator system which utilizes a super-regenerative system with a feedback proportional to thte sum of an amplified periodic input signal and the product of the input to the system output of the system being applied through a time delayed network to a multiplier in an arrangement in which the sum of the product of the multiplier and the amplified input is further amplified and a portion thereof time delayed so that through the action of the multiplier, the periodic input signal and harmonics thereof will be amplified so long as the input signal has a period equal to a multiple of the delay time provided by the time delay network to effect an increase in the input signal-to-noise component ratio while due to the randomness of the noise component present with the periodic input signal, the noise component by such action of the multiplier will not be amplified as greatly as the input control signal so as to yield in effect at the output of the system a greater increase in the periodic input signal than in the random noise component and thereby provide an improvement in the periodic input signal-to-noise component ratio.

Another object of the invention is to provide a simple and accurate method of improving the signal-to-noise ratio of a periodic input signal.

Another object of the invention is to provide a novel system to improve the signal-to-noise ratio of an input control signal.

Another object of the invention is to provide a novel method and system utilizing a multiplication technique which enhances electrical periodic signals which are harmonics of the basic periodic signal frequency and rejects all other signals so as to effectively increase the periodic input signal in relation to random noise signals that may be present therein.

Another object of the invention is to provide an electronic data processing loop system embodying a super-regenerative system in which there is provided a feedback proportional to the product of the input and output in which the desired input is greater than or equal to zero or any noise signal.

Another object of the invention is to provide a regenerative feedback system in which an input signal to be applied thereto has a periodic equal to a multiple of the delay time of a delay time network in the feedback system and in which the harmonics of the input signal will be amplified by the action of a multiplier to yield an increase in the signal-to-noise ratio, since due to the randomness of the noise component present with the input signal the noise signal will not be amplified as great as the input signal.

Another object of the invention is to provide in such a data correlator system, a novel super-regenerative feedback system to effect multiplication of an input signal by a previous period time delayed input to effect repetitive multiplication, and a system particularly adapted for use with a star tracker to increase the signal-to-noise ratio of the star tracker system to a point whereby the star tracker system may be used in broad daylight.

These and other objects and features of the invention are pointed out in the following description in terms of the embodiment thereof which is shown in the accompanying drawings. It is to be understood, however, that the drawings are for the purpose of illustration only and are not a definition of the limits of the invention, reference being had to the appended claims for this purpose.

DESCRIPTION OF THE INVENTION

Figure 1:
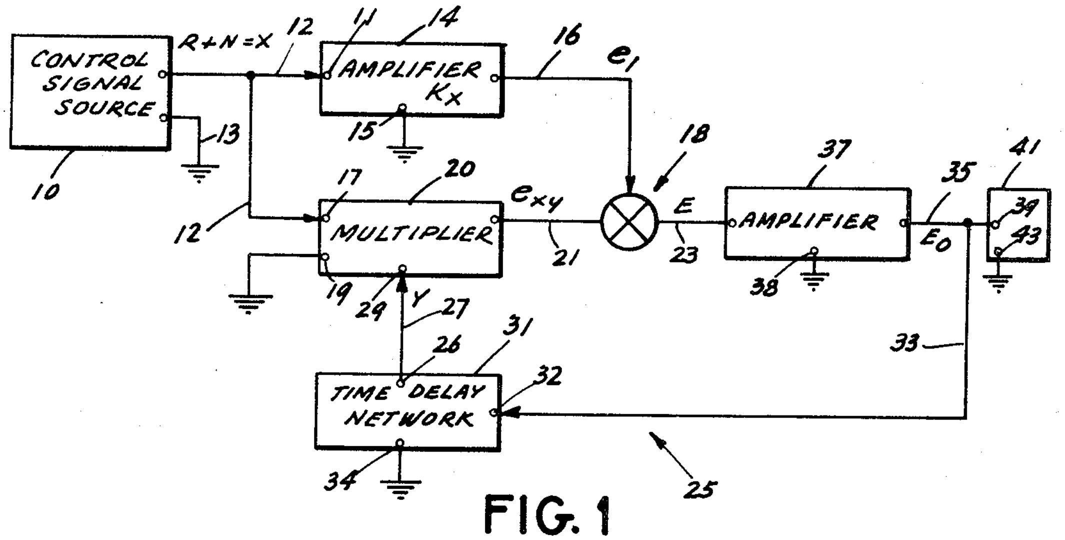
FIGURE 1 is a block diagram of a system embodying the invention in which the several component parts thereof illustrated by the blocks may be of conventional type.

Referring to the drawing, there is shown a data correlator system in which the invention may be applied to improve the signal-to-noise ratio of the system wherein the electrical information is presented as a phase, phase width, or amplitude modulation signal by a conventional type electrical signal source indicated generally by the numeral 10. The electrical signal is applied from the source 10 across line 12 and grounded line 13 which are in turn connected, respectively, to an input terminal 11 and a grounded input-output terminal 15 of an amplifier 14 which may be of a conventional constant gain type having an output line 16 connected to an input of an electrical summation device 18 also of a conventional type. The line 12 and grounded line 13 are also connected, respectively, to an input terminal 17 and a grounded input-output terminal 19 of an electronic multiplier 20 of a conventional type in which the input signals are multiplied one by the other to cause an output $e_{xy}$ as the product of the input signals so that if either of the input signals appearing to the multiplier 20 at the inputs 17 and 29 is zero while the other is of finite value, the output signal $e_{xy}$ is substantially zero. The multiplier 20 has an output line 21 leading to another input of the summation device 18 which has output line 23 to which is applied a summation of signals $e_1$ and $e_{xy}$ applied to the lines 16 and 21, respectively.

The application of the present invention to the data correlator system shown in the drawing is based on the use of a multiplication technique in the operation of the multiplier 20 which in effect enhances the basic periodic signals of the system and harmonics thereof and rejects all other signals such as electrical noise components. The data correlator system embodies a super-regenerative system 25 in which an electrical feedback is provided through the multiplier 20 which is proportional to the product of the input and a delayed output. This output is applied through the time-delay network 31 back to the multiplier 20. The feedback loop 25 is a super-regenerative system in which the electrical feedback signal includes the amplified product of the input signal X applied through conductor 12 to the multiplier 20 and the delayed output signal Y provided on the output line 27 from the delay network 31.

The regenerative action of the feedback loop 25 is begun with the input signal X applied by the source 10, which input signal X includes the desired input control signal R plus a noise signal or component N times a gain constant $K_x$ provided by the amplifier 14 to yield an output signal $e_1$ on the output line 16. This amplified outputput signal $e_1$ is in turn added at the summation device 18, of conventional type, to any signal $e_{xy}$ provided by the multiplier 20 on the line 21 to provide at the output line 23 leading from the summation device 18 a signal E which is the sum of the signals $e_1$ and $e_{xy}$.

The feedback multiplier signal Y is provided at the output line 27 leading from an output terminal 26 of the time delay network 31 which in turn has an input conductor 33 leading to an input terminal 32 of the time delay network 31 from the output conductor 35 of an amplifier 37. The time delay network 31 has a grounded input-output terminal 34 while the amplifier 37 has a grounded input-output terminal 38. The amplifier 37 is of a conventional constant gain type having the input line 23 leading from the output of the summation device 18, so as to effectively close the regenerative feedback loop 25.

The output line 35 leading from the amplifier 37 is connected to an input terminal 39 of a suitable electrically operated device 41 having a grounded input terminal 43 so that the device 41 may be responsive to the output signal $E_0$ applied across the output line 35 and the grounded input-output terminal 38 of the amplifier 37.

Figure 2:
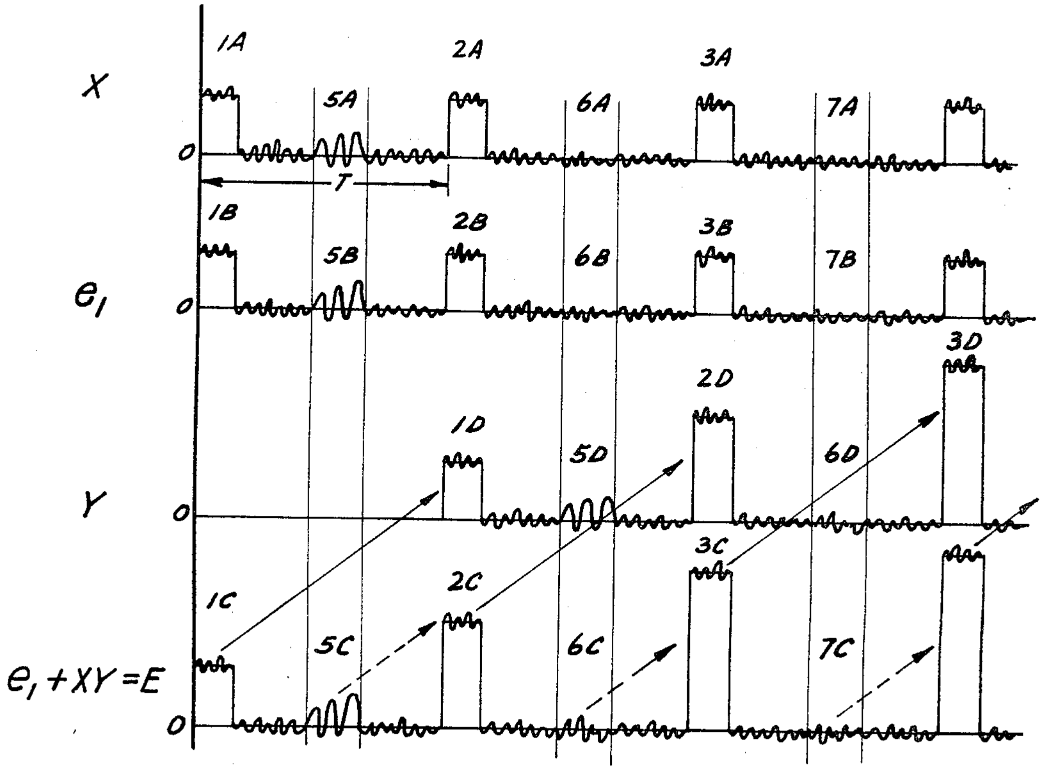
FIGURE 2 is a graphical diagrammatic representation of the various wave shapes exhibited at various points in the diagram of FIGURE 1.

Referring to the drawing of FIGURE 2, the wave shapes X, $e_1$, Y and E (the product of $X \times Y$ added to $e_1$) are illustrated in a time sequence, the respective signals appearing at the various corresponding points of the circuit in FIGURE 1. For the purpose of illustration, the periodic input signal X is a group of periodically recurring positive square waves having a period of recurrence T in units of time which period is substantially defined as the inverse of the frequency of the input signal X. At the beginning of the first period the input signal X is applied from control source 10 as a square wave 1A, a portion of which is amplified by amplifier 14 of constant gain $K_x$ and which simultaneously appears as $e_1$ on line 16 as square wave 1B and at E as square wave 1C, the latter being substantially the summation value of $e_1$, since the product $X \times Y$, Y being zero, is zero. The square wave 1C is amplified by the constant gain amplifier 37 and in turn as amplified is fed back through the time delay network 31 and conductor 27 to the input 29 of the multiplier 20.

The time delay network 31 delays the amplified square wave 1C fed back to the multiplier 20 for a time substantially equal to the period T of the periodic input signal X and which period T is substantially defined as the inverse of the frequency of the input signal X; that is, the delay time of the time delay network 31 is equal to the time of recurrence between successive pulses of the signal X from the contorl source 10. Thus, the amplified square wave 1C being delayed by one time period appears at input 29 of the multiplier as square wave 1D, one time period delayed from the square wave 1C. The square wave 1D is multiplied by a portion of a second portion of the signal X which is the square wave 2A simultaneously appearing at the input 17 of the multiplier 20. This product is then added to the square wave 2B which simultaneously appears as a second square waves 2D and 3A is added to the square wave 3B of $e_1$ the conductor 23 leading from the output of the summation device 18. The wave 2C is then amplified at 37, delayed by a single time period T by the time delay network 31, and appears at input 29 of the multiplier 20 as the delayed wave 2D which is multiplied by the third square wave 3A of the input signal X simultaneously appearing at the multiplier input 17. The product of the waves 2D and 3A is added to th esquare wave 3B of $e_1$ at the summation device 18 to effect the third wave 3C of E which is amplified by amplifier 37 and the amplified waves 2D and 3A is added to the square wave 3B of $e_1$ amplified wave 3C or $E_0$ is delayed by the time delay network 31 for a period of T seconds and appears as the new Y signal wave 3D. The cycle repeats itself as E, $E_0$ and Y continue to get larger until a point of saturation of the multiplier 20 is reached, at which time the maximum signal-to-noise ratio for the system is attained.

It should also be obvious that harmonics of the periodic input signal X will also be multipled and appear at the output line 35 of the system, since a signal of frequency $2f$, $3f$ . . . etc., where $f$ is the fundamental frequency of periodic input signal X, repeats itself every ½T, ⅓T . . . etc. Therefore, input signals of frequency $2f$, $3f$ . . . etc. repeat respective cycles every ½T, T . . . etc., ⅓T, ⅔T, T . . . etc. so that a first amplified cycle of the amplified periodic input signal harmonic appears at input 29 of multiplier 20 simultaneously with the third cycle of the second harmonic, the fourth cycle of the third harmonic, etc.

The first period of time T is the only period during which the product $e_{xy}$ is substantially zero after the periodic input signal X is applied at input conductor 12 but thereafter the delayed signal Y is multiplied by X to provide $e_{xy}$ which is summed with $e_1$ while $E_0$ appears as the amplified value of the sum.

In the following the analysis and with reference in particular to the wave shape diagram of FIGURE 2, a noise component illustrated at 5A in FIGURE 2 is shown occurring in a random fashion during the first applied cycle of the periodic input signal X and appearing subsequent to the pulse 1A. The noise simultaneously appears as noise 5B as illustrated on the $e_1$ diagram as amplified by amplifier 14 and further appears at the output conductor 23 leading from the summation device 18 in the E diagram of FIGURE 2 as noise 5C.

The amplified noise 5C or signal E is applied after a delay of T seconds through the delay network 31 to the input terminal 29 of the multiplier 20. This random amplified and delayed noise appears on the Y diagram of FIGURE 2 as noise component 5D which is multiplied by a random noise appearing simultaneously in the input 17 of multiplier 20 illustrated on the X diagram by noise 6A, which noise appearing in random phase and amplitude may be effective upon multiplication with the random amplified and delayed noise component 5D to effect a product which is added to the random noise component 6B illustrated in the $e_1$ wave shape diagram.

The noise signal 6C, the product of waves 6A and 5D added to wave 6B which appears at conductor 23 as the wave E of the diagram of FIGURE 2 is then amplified by the amplifier 37 and delayed for a period of T seconds by the time delay network 31 before appearing at the input 29 of the multiplier 20 as illustrated in the Y diagram of FIGURE 2 as noise 6D. The random amplifier and delayed noise 6D is in turn multiplied by the random noise 7A simultaneously appearing at input 17 of the multiplier 20 as illustrated in the X diagram of FIGURE 2.

The product of noise 6D and noise 7A is then added to noise 7B on the $e_1$ diagram at the summation device 18 and applied through the output conductor 23, as illustrated in the E diagram of FIGURE 2 as noise 7C and which illustrates the effective cancellation of random noise components throughout the system by the effect of the components of the random noise in the X and Y waves at the lines 12 and 27 in the multiplication of the one by the other in the multiplier 20 as the above operation continues.

Thus, a noise component N being present in the first applied cycle of the periodic input signal X is amplified by amplifier 37, appears at output conductor 35 and is applied after a delay of T seconds to input 29 of multiplier 20. The noise component is multiplied by the component of noise appearing simultaneously at input 17 of multiplier 20 which noise, appearing in random phase and amplitude is effectively averaged out to zero upon successive multiplication by noise components of the signal Y as the cycle repeats itself.

In summary, a first multiplier 20 output product signal $e_{xy}$ is applied to summation device 18 and added to $e_1$ which in following the events of the sequence of the example is the second cycle of input signal X amplified by amplifier 14. The summation signal E is applied through amplifier 37 and appears as $E_0$ at the output conductor 35. The new signal $E_0$ is applied as the new signal Y at multiplier input 29 which signal is delayed by the time delay network 31 by T seconds from the second cycle of the periodic input signal X and therefore appears at input 29 simultaneously with the third cycle of input signal X applied at the input 17. The operation repeats itself until a point of saturation of the multiplier 20 is reached at which the signal-to-noise ratio maximum for the system is attained.

Due to the randomness of the electrical noise component present in the input signal X with the control signal R, as well as in the multiplier signal Y, the noise component N is effectively cancelled by the effect of the noise components N in one or the other of the multiplier signals X and Y which cause the multiplier 20 and device 18 to provide a resultant signal $e_{xy}$ and $e_1$ or E in which the amplifier input control signal R will be effectively increased in relation to the value of the electrical noise component to improve the signal-to-noise ratio of the amplified output signal $E_0$ applied at the electrical output conductor 35 of the system.

There is thus provided in the present invention an electronic system for improving at the output 35 the ratio of the control signal R to the noise constant N and a system which may be applied to high noise environment systems such as daylight star trackers and the like.

Although only one embodiment of the invention has been illustrated and described, various changes in the form and relative arrangement of the parts, which will now appear to those skilled in the art may be made without departing from the scope of the invention. Reference is, therefore, to be had to the appended claims for a definition of the limits of the invention.

What is claimed is:

1. A system for improving signal-to-noise ratio in a constant frequency noisy periodic input signal having a random noise component, the system comprising:

an amplifier;

a multiplier;

means for applying the periodic signal to an input of the amplifier and to a first input of the multiplier;

a summation device operatively connected to an output of the amplifier and an output of the multiplier for providing at the output of the system a resultant summation of the outputs from the amplifier and multiplier; and a time delay feedback network for feeding a delayed portion of the summation output to a second input of the multiplier so as to provide at the output of the multiplier a product of the delayed portion of the summation output and the constant frequency periodic signal so as to effectively multiply the constant frequency period signal while rejecting the random electrical noise component to improve the constant frequency periodic signal-to-noise ratio at the output of the system.

2. The system for improving signal-to-noise ratio of a periodic input signal as defined by claim 1 wherein:

the delay provided by the time delay feedback network is substantially equal to a multiple of the period of the periodic input signal.

3. A method of improving signal-to-noise ratio of a constant frequency noisy periodic input signal, the steps comprising:

(a) delaying a first portion of the periodic input signal for a delay time substantially equal to an inverse of the frequency of the periodic signal, (b) multiplying a succeeding second portion of the periodic input signal by the delayed first portion of the periodic signal to effect a resultant output signal, (c) delaying a portion of the resultant output signal, (d) multiplying a succeeding third portion of the periodic input signal by the delayed portion of the resultant output signal, (e) and thereafter for the duration of the periodic input signal multiplying succeeding portions of the input signal by the delayed portion of the resultant output signal effected by the immediately preceding portion of the periodic input signal.

4. The method of improving the signal-to-noise ratio of the periodic input signal as defined by claim 3 further including the steps of:

amplifying the second portion of the periodic input signal simultaneously with the multiplying of the second portion of the periodic input signal by the delayed first portion of the periodic signal, summing the amplified second portion of the periodic input signal with a resultant product of said last mentioned multiplication to effect the resultant output signal, thereafter repetitively delaying a portion of the resultant output signal, multiplying the succeeding third portion of the periodic input signal by the delayed portion of the resultant output signal, and thereafter for the duration of the periodic input signal multiplying succeeding portions of the input signal by the delayed portion of the resultant sum of the product and amplification of the immediately preceding portions of the periodic input signal so as to effect by the multiplication of the constant frequency periodic input signal a rejection of random electrical noise components of the periodic input signal to improve the constant frequency periodic signal-to-noise ratio of the resultant output signal.

5. A system for improving signal-to-noise ratio in a constant frequency noisy periodic input signal having a random noise component, the system comprising:

an electrical multiplier means having first and second inputs and an output, an electrical summation device having first and second inputs and an output, first means electrically connecting a portion of the periodic input signal to the first of the inputs of the summation device, second means electrically connecting another portion of the periodic input signal to the first of the inputs of the multiplier means, means electrically connecting the output of the multiplier means to the second of the inputs of the summation device, output means electrically connected to the output of the summation device, a time delay electrical feedback means having an input and an output, means electrically connecting a portion of the output at the output means to the input of the time delay feedback means, and other means for electrically connecting the output from the time delay electrical feedback means to the second of the inputs to the multiplier means, the time delay feedback means being operative to delay the portion of the instant summation output fed back to the second input of the multiplier by a time period substantially equal to a multiple of the period of the periodic input signal.

6. The combination defined by claim 5 in which the first means electrically connecting a portion of the periodic input signal to the first of the inputs of the summation device includes a constant gain amplifier.

7. The combination defined by claim 5 in which the output means includes a constant gain amplifier.

8. The combination defined by claim 5 in which the first means electrically connecting a portion of the periodic input signal to the first of the inputs of the summation device includes a first constant gain amplifier, and the output means includes a second constant gain amplifier.

References Cited

UNITED STATES PATENTS 2,908,812 10/1959 Laurent ------------ 328—165

RODNEY D. BENNETT, *Primary Examiner.*

D. C. KAUFMAN, *Assistant Examiner.*

U.S. Cl. X.R.

325—474; 328—139